UNITED STATES PATENT OFFICE 2,623,975

METHOD OF WELDING MOLYBDENUM

Ward W. Watrous, Jr., Chatham, N. J., assignor to Chatham Electronics Corporation, Newark, N. J., a corporation of New Jersey No Drawing. Application November 8, 1951, Serial No. 255,517

7 Claims. (Cl. 219—10)

This invention relates to a method of welding two pieces of molybdenum, and has particular reference to the methods and processes used in handling an intermediate welding material composed of a binder and two metallic powders.

Heretofore, molybdenum has been welded to tungsten and other high melting point metals by using very high currents in an electric spot welder or by using a strip of intermediate metal, such as nickel or cobalt, to act as a solder or flux between the metals to be welded. Such welds, however, require high welding current and have not been wholly successful, producing welds of variable strength, and for this reason recourse has generally been had to riveting and other forms of mechanical fastening arrangements.

The invention herein described produces an extremely strong weld between two pieces of molybdenum or between molybdenum and tungsten, and requires a welding temperature which is not only far below the melting point of molybdenum or tungsten, but also below the melting point of nickel.

One of the objects of this invention is to provide an improved method of welding high refractory metals which avoids one or more of the disadvantages and limitations of prior art arrangements.

Another object of the invention is to provide a welding method which may be adapted to ordinary shop routine and produce welds which may be accurately aligned and placed.

Another object of the invention is to reduce the cost of welding molybdenum structures.

Another object of the invention is to increase the strength of molybdenum welds to a value which is practically equal to the strength of the metal itself.

Another object of the invention is to produce a weld at a comparatively low temperature which thereafter will withstand temperatures far in excess of the welding temperature.

The invention includes the method of welding molybdenum parts which comprises the following steps: First, a mixture of molybdeum powder and nickel powder (equal parts by weight) are mixed with a binder of nitro-cellulose plus a solvent. Second, this mixture in the form of a thick paste is painted on one or both of the parts to be welded. Third, the painted parts are put into a furnace and heated to 1100° C. for fifteen minutes. This operation burns off the binder and partially sinters the mixture of molybdenum and nickel. Fourth, the parts are placed between the electrodes of an electric spot welder and welded in the usual manner.

It is well known that molybdeum and nickel form a eutectic mixture when about equal parts of the metals are used. This mixture melts at about 1300° C., which is considerably lower than the melting point of either of the two metals, nickel melting at 1490° C. and molybdenum melting at 2620° C. While the use of a previously prepared alloy made of equal parts of the two metals might be very useful in welding work, it has been found by experiment that mixing the metals in the form of a fine powder works very well and produces a strong weld. The binder of nitro-cellulose plus a solvent is necessary to hold the powder in place prior to the sintering action, but after the parts have been properly coated the binder must be eliminated. This can be accomplished by putting the pieces to be welded in a furnace and raising the temperature to about 1100° C. This operation not only vaporizes the solvent and eliminates the binder material by burning, but also partially sinters the powder material so that the parts may be removed from the furnace and placed in an electric welding machine without removing the eutectic mixture. The weld is completed by the application of pressure and a large welding current in accordance with the usual procedure followed in spot welding techniques. An examination of such welds indicates that the two powders flow together, forming a eutectic mixture but, in addition, some of the nickel diffuses into the surface of the molybdeum parts, thereby forming a non-eutectic mixture which melts at considerably greater temperatures than the eutectic alloy. This diffusion forms a weld which can only be melted by the application of a considerably higher temperature at a later time.

In order to illustrate the application of this method to standard shop practice, the following example is given: A boss of molybdenum one-half inch in diameter was welded to a molybdenum sheet .070 inch thick by the method described above. The spot welder used about 35,000 amperes for a duration of ten cycles (60 cycle power supply). The result was a weld which was apparently as strong as the metal itself.

While the above description is confined to the specific percentages and temperatures, it will be obvious that various changes and modifications may be made without departing from the field of the invention which should be limited only by the scope of the appended claims.

I claim:

1. A method of welding two pieces of molybdeenum which comprises the following steps; depositing a layer of flux material on the surfaces to be joined, said flux material comprising a mixture of equal parts of powdered molybdenum and powdered nickel, a binder material, and a solvent for the binder; heating the pieces in a furnace to a temperature which lies within the range of 950° to 1150° centigrade for at least ten minutes; and then spot-welding the pieces together in an electric spot welder by the application of pressure and the transmission of electric current.

2. A method of welding two pieces of molybdenum which comprises the following steps; depositing a thin layer of flux material on at least one of the surfaces to be joined, said flux material comprising a mixture of substantially equal parts of powdered molybdenum and powdered nickel, a binder material, and sufficient solvent for the binder to produce a viscous liquid; heating the molybdenum and flux material in a furnace to a temperature which lies within the range of 950° to 1150° centigrade for at least ten minutes; and then spot-welding the pieces of molybdenum together in an electric spot welder by the application of pressure and the transmission of electric current.

3. A method of welding two pieces of molybdenum which comprises the following steps; depositing a thin layer of flux material on at least one of the surfaces to be joined, said flux material comprising a mixture of substantially equal parts of powdered molybenum and powdered nickel plus a binder material and sufficient solvent for the binder to produce a viscous liquid; eliminating the solvent by drying; heating the molybdenum and flux material in a furnace to a temperature which lies within the range of 950° to 1150° centigrade for at least ten minutes; and then spot-welding the pieces of molybdenum together in an electric spot welder by the application of pressure and the transmission of electric current.

4. A method of welding two pieces of molybdenum which comprises the following steps; depositing a thin layer of flux material on at least one of the surfaces to be joined, said flux material comprising a mixture of substantially equal parts of powdered molybdenum and powdered nickel plus a binder material and sufficient solvent for the binder to produce a viscous liquid; eliminating the solvent by drying; heating the molybdenum and flux material in a furnace to a temperature which lies within the range of 950° to 1150° centigrade for at least ten minutes to burn off the binder material; and then spot-welding the pieces of molybdenum together in an electric spot welder by the application of pressure and the transmission of electric current.

5. A method of welding two pieces of molybdenum which comprises the following steps; depositing a thin layer of flux material on at least one of the surfaces to be joined, said flux material comprising a mixture of substantially equal parts of powdered molybdenum and powdered nickel plus a binder of nitrocellulose and sufficient solvent for the binder to produce a viscous liquid; eliminating the solvent by drying; heating the molybdenum and flux material in a furnace to a temperature which lies within the range of 950° to 1150° centigrade for at least ten minutes to burn off the binder material and to sinter the powdered metal particles to form an alloy material; and then spot-welding the pieces of molybdenum together in an electric spot welder by the application of pressure and the transmission of electric current.

6. A method of welding two pieces of metal selected from the group having atomic weights from 180 to 196 which comprises the following steps; depositing a layer of flux material on the surfaces to be joined, said flux material comprising a mixture of powdered molybdenum, powdered nickel, a binder, and a solvent for the binder; heating the pieces in a furnace to a temperature which lies within the range of 950° to 1150° centigrade for at least ten minutes; and then spot-welding the pieces together in an electric spot welder by the application of pressure and the transmission of electric current.

7. A method of welding two pieces of metal selected from the group having atomic weights from 180 to 196 which comprises the following steps; depositing a thin layer of flux material on at least one of the surfaces to be joined, said flux material comprising a mixture of substantially equal parts of powdered molybdenum and powdered nickel plus a binder of nitrocellulose and sufficient solvent for the binder to produce a viscous liquid; eliminating the solvent by drying; heating the pieces and flux material in a furnace to a temperature which lies within the range of 950° to 1150° centigrade for at least ten minutes to burn off the binder material and to sinter the powdered metal particles to form an alloy material; and then spot-welding the pieces together in an electric spot welder by the application of pressure and the transmission of electric current.

WARD W. WATROUS, Jr.

REFERENCES CITED

The following references are of record in the file of this patent:

UNITED STATES PATENTS

| Number | Name | Date |
|---|---|---|
| 1,469,043 | Laise et al. | Sept. 25, 1923 |

OTHER REFERENCES

Miller: "Metal Industry," November 18, 1949; pp. 439, 440, 441.